United States Patent
Rothhämel

(10) Patent No.: US 11,415,996 B2
(45) Date of Patent: Aug. 16, 2022

(54) POSITIONING SYSTEM FOR A MOBILE UNIT, VEHICLE AND METHOD FOR OPERATING A POSITIONING SYSTEM

(71) Applicant: Volkswagen Aktiengesellschaft, Wolfsburg (DE)

(72) Inventor: Malte Rothhämel, Huddinge (SE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 300 days.

(21) Appl. No.: 16/335,788

(22) PCT Filed: Jul. 24, 2017

(86) PCT No.: PCT/EP2017/068680
§ 371 (c)(1),
(2) Date: Mar. 22, 2019

(87) PCT Pub. No.: WO2018/054579
PCT Pub. Date: Mar. 29, 2018

(65) Prior Publication Data
US 2019/0250628 A1    Aug. 15, 2019

(30) Foreign Application Priority Data
Sep. 22, 2016    (DE) .............. 10 2016 218 232.3

(51) Int. Cl.
G05D 1/02       (2020.01)
G01C 21/16      (2006.01)
(Continued)

(52) U.S. Cl.
CPC .......... G05D 1/0221 (2013.01); G01C 21/165 (2013.01); G01S 19/47 (2013.01); G06N 3/08 (2013.01); *G05D 2201/0213* (2013.01)

(58) Field of Classification Search
CPC ............... G05D 1/0221; G05D 1/0212; G05D 2201/0213; G05D 1/0088; G01C 21/165; G06N 3/08; B60W 60/00; G01S 19/47
(Continued)

(56) References Cited

U.S. PATENT DOCUMENTS

| 7,979,172 B2 | 7/2011 | Breed | 701/23 |
| 8,566,022 B1 * | 10/2013 | Starenky | G01S 19/42 455/433 |

(Continued)

FOREIGN PATENT DOCUMENTS

| DE | 4001493 A1 | 7/1991 | B25J 9/18 |
| DE | 19633884 A1 | 3/1998 | B61L 25/02 |

(Continued)

OTHER PUBLICATIONS

Wang, Meiling et al., "Data Fusion of ALV GPS/DR Integrated Navigation System Based on BP Neural Network," Department of Automatic Control, Beijing Institute of Technology, 4 pages, Feb. 10, 2009.

(Continued)

*Primary Examiner* — Angelina Shudy
(74) *Attorney, Agent, or Firm* — Slayden Grubert Beard PLLC

(57) ABSTRACT

The invention relates to a positioning system for a mobile unit with a reference localization unit, through which a first reference position can be captured at a first point in time and a second reference position of the mobile unit can be captured at a later second point in time; a capturing unit, through with movement data of the mobile unit can be captured; and a computing unit, through which a calculated second position of the mobile unit can be determined at the second point in time by means of a neural network based on the first reference position and the captured movement data.

(Continued)

At least one parameter of the neural network can thereby be adjusted based on a comparison of the second reference position with the calculated second position. The invention further relates to a method for operating a positioning system for a mobile unit, in which a first reference position of the mobile unit is captured at a first point in time. Furthermore, movement data from the mobile unit is captured, and a calculated second position of the mobile unit is determined at the second point in time by means of a neural network based on the first reference position and the captured movement data. A second reference position of the mobile unit is captured at the second point in time, wherein a parameter of the neural network is adjusted based on a comparison of the second reference position with the calculated second position.

14 Claims, 1 Drawing Sheet

(51) Int. Cl.
*G01S 19/47* (2010.01)
*G06N 3/08* (2006.01)

(58) Field of Classification Search
USPC .......................................................... 701/23
See application file for complete search history.

(56) References Cited

U.S. PATENT DOCUMENTS

| | | | | |
|---|---|---|---|---|
| 8,577,596 | B2* | 11/2013 | Stahlin | G01C 21/32 701/409 |
| 11,009,365 | B2* | 5/2021 | Wang | G08G 1/167 |
| 2009/0018771 | A1* | 1/2009 | Hollis | G01L 7/00 348/81 |
| 2009/0271108 | A1 | 10/2009 | Kobori et al. | 701/532 |
| 2011/0118929 | A1* | 5/2011 | Takae | B60K 35/00 701/31.4 |
| 2011/0204722 | A1 | 8/2011 | Kim | 307/77 |
| 2012/0116676 | A1* | 5/2012 | Basnayake | G01C 21/3602 701/472 |
| 2012/0221244 | A1* | 8/2012 | Georgy | G01C 21/165 701/472 |
| 2013/0093618 | A1* | 4/2013 | Oh | G01S 5/0072 342/357.44 |
| 2013/0231824 | A1 | 9/2013 | Wilson et al. | 701/26 |
| 2014/0149032 | A1* | 5/2014 | Barrett | G01C 21/32 701/409 |
| 2015/0084812 | A1* | 3/2015 | Sernik | G01S 19/21 342/357.43 |
| 2016/0069690 | A1 | 3/2016 | Li et al. | 701/412 |
| 2016/0116291 | A1* | 4/2016 | Chien | G01C 21/30 701/519 |
| 2016/0353099 | A1* | 12/2016 | Thomson | B60R 11/04 |
| 2016/0364990 | A1* | 12/2016 | Khaghani | G05D 1/0088 |
| 2017/0010618 | A1* | 1/2017 | Shashua | G01C 21/34 |
| 2017/0219360 | A1* | 8/2017 | Cui | G01C 21/34 |
| 2017/0248962 | A1 | 8/2017 | Hasberg et al. | |
| 2017/0305438 | A1* | 10/2017 | Poledna | G06K 9/6262 |
| 2018/0050704 | A1* | 2/2018 | Tascione | B60W 10/04 |
| 2018/0074201 | A1* | 3/2018 | Sakai | G05D 1/0274 |
| 2018/0074493 | A1* | 3/2018 | Prokhorov | G05D 1/0274 |
| 2018/0101174 | A1* | 4/2018 | Hopkins | G01C 21/165 |
| 2018/0188382 | A1* | 7/2018 | Jose | G01S 19/47 |
| 2018/0188736 | A1* | 7/2018 | Jian | G01C 21/30 |
| 2018/0239029 | A1* | 8/2018 | Shibata | G01S 19/44 |
| 2018/0292840 | A1* | 10/2018 | Sakai | G08G 1/207 |
| 2019/0137280 | A1* | 5/2019 | Ghadiok | G06T 7/73 |
| 2019/0204092 | A1* | 7/2019 | Wheeler | G05D 1/027 |
| 2019/0320290 | A1* | 10/2019 | Cordova | G01C 21/28 |
| 2019/0354111 | A1* | 11/2019 | Cheng | G05D 1/0011 |
| 2020/0064857 | A1* | 2/2020 | Gagne | A47L 9/009 |
| 2020/0207375 | A1* | 7/2020 | Mehta | G05D 1/0212 |
| 2020/0402288 | A1* | 12/2020 | Yerli | A63F 13/211 |
| 2021/0001896 | A1* | 1/2021 | Clark | G01S 19/215 |

FOREIGN PATENT DOCUMENTS

| | | | | |
|---|---|---|---|---|
| DE | 10149206 | A1 | 2/2003 | B60N 2/28 |
| DE | 102014221888 | A1 | 4/2016 | B60W 40/02 |
| EP | 2527943 | A1 | 11/2012 | G05D 1/02 |
| EP | 2949534 | A2 | 12/2015 | B60W 50/02 |
| EP | 2950237 | A1 | 12/2015 | G06K 9/00 |
| GB | 2373117 | A | 9/2002 | G01S 5/14 |
| WO | 00/73815 | A1 | 12/2000 | G01C 21/16 |
| WO | 2018/054579 | A1 | 3/2018 | G01C 21/16 |

OTHER PUBLICATIONS

Noureldin, Aboelmagd et al., "GPS/INS Integration Utilizing Dynamic Neural Networks for Vehicular Navigation," Information Fusion, vol. 12, pp. 48-57, Jan. 18, 2010.

International Search Report and Written Opinion, Application No. PCT/EP2017/068680, 9 pages, dated Nov. 13, 2017.

* cited by examiner

POSITIONING SYSTEM FOR A MOBILE UNIT, VEHICLE AND METHOD FOR OPERATING A POSITIONING SYSTEM

CROSS-REFERENCE TO RELATED APPLICATIONS

This application claims priority to German Application No. 10 2016 218 232.3, filed on Sep. 22, 2016 with the German Patent and Trademark Office. The contents of the aforesaid application are incorporated herein for all purposes.

TECHNICAL FIELD

The present invention relates to a positioning system for a mobile unit as well as a vehicle with a positioning system. It further relates to a method for operating a positioning system for a mobile unit.

BACKGROUND

Mobile user devices, for example mobile telephones and vehicles with corresponding apparatuses, offer to an increasing degree functions, for which exact information on the position of the mobile unit are very important. For example, navigation systems can output instructions for a user on navigating along a certain route and provide information that can be used for a partially or completely autonomous control of a vehicle.

In the field of the autonomous control of vehicles, it is known for example from DE 40 01 493 A1 that a device executes in a self-controlled manner a specified movement flow cycle, wherein sensor data is obtained. The sensor data is repeatedly entered into a neural network in a learning phase and the movement flow cycle is repeated until a specified global error is fallen short of and the learning phase is completed. A transition to a subsequent ability phase, in which the device executes autonomously the learned movement flow cycle based on the neural network or corrects faulty handling, takes place.

Furthermore, Dean A. Pomerlau (NIPS-3 Proceedings of the 1990 conference on Advances in neural information processing systems 3; pages 429-435) describes a method, in which a vehicle is controlled manually during a learning phase of a neural network. Data is thereby captured by a camera. Based on the captured data, further virtual examples of the ride are generated through lateral displacement, through which the neural network is trained.

Moreover, a method for mapping a street is known from DE 101 49 206 A1, in which a reaction is captured by means of a neural fuzzy logic system and systems of a vehicle can be controlled.

US 2013/0231824 A1 finally describes a system, in which a neural network is used to avoid a collision with an object or to initiate another reaction.

SUMMARY

It is particularly important for a (partially) autonomous ride that the position of the mobile unit be known as precisely as possible. The known systems are, however, frequently susceptible to malfunctions that can for example occur when the position of the mobile unit cannot be determined or cannot be determined sufficiently accurately. This can be the case for example when the receiving of signals necessary for positioning is restricted due to unfavorable conditions in the environment or when individual system components fail.

Moreover, markers can be used, for example magnetic markers in the traffic lanes or special optical markers in the vicinity of the traffic lane, which can be detected by corresponding sensors and used for localization.

Thus, a technical object exists of providing a positioning system, a vehicle, and a method for operating a positioning system, which permit a particularly secure and robust determination of the position of the mobile unit.

This object is solved according to the invention by a positioning system, a vehicle, and a method according to the independent claims. Specific embodiments and further developments are discussed in the dependent claims and the following description.

DETAILED DESCRIPTION

Figure 1:
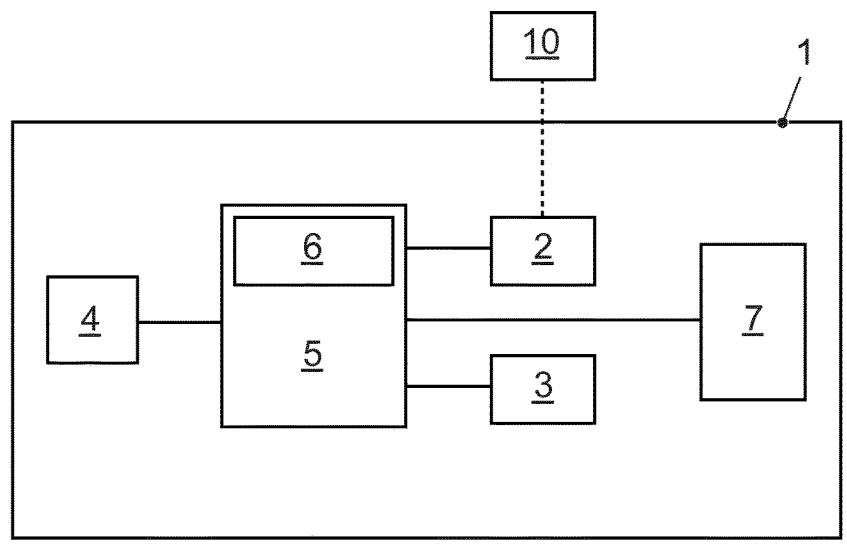
FIG. 1 shows an exemplary embodiment of a vehicle according to the invention.

In one aspect, a positioning system for a mobile unit comprises a reference localization unit, through which a first reference position can be captured at a first point in time and a second reference position of the mobile unit can be captured at a later second point in time. Furthermore, it may comprise a capturing unit, through which movement data from the mobile unit can be captured, as well as a computing unit, through which a calculated second position of the mobile unit can be determined at the second point in time by means of a neural network based on the first reference position and the captured movement data. At least one parameter of the neural network can thereby be adjusted based on a comparison of the second reference position with the calculated second position.

A particularly good localization can thereby be provided, wherein in particular an improved redundancy of the system can be provided in order to be able to compensate for a complete or partial failure of the localization unit. In particular, this is beneficial for a complete or partially autonomous movement control of the mobile unit.

The "position" of the mobile unit means localization in a coordinate system. The coordinate system can be designed absolutely corresponding to a world coordinate system, for example as a global coordinate system. It can further be determined relative to a reference point, for example relative to a landmark. In the broader sense, the position further comprises directional information, in particular an alignment of the mobile unit within the coordinate system.

In some embodiments of the positioning system according to the present explanation, the reference positions can be captured by the reference localization unit based on a navigation satellite system. A widely available system for capturing the reference positions can thereby be used.

The first and second reference position may be determined in a generally known manner, for example by means of GPS, if applicable supported by correction methods (for example DGPS), or based on a comparable system. Alternatively or additionally and in some embodiments, further methods for determining the reference position can be used, for example based on landmarks. The reference localization unit may comprise generally known sensors, for example a GPS sensor as well as alternatively or additionally optical sensors, radar sensors and/or other sensors.

All positions, i.e., the first and second reference position as well as the second calculated position, may be determined relative to different coordinate systems, for example a global coordinate system, as is for example common for generally known GPS processes. Furthermore, a relative coordinate system may e.g. be used, whereby the positions are determined in particular relative to a certain coordinate origin. For example, the positions relative to the progression of a traffic lane may be specified, for example as a lateral position relative to the width of the traffic lane or as a position along the progression of the traffic lane, wherein for example a virtual center line of the traffic lane can be assumed.

Points in time may be assigned to each of the positions, wherein the mobile unit at a certain point in time is located at an actual position. The captured reference position and the calculated position for the point in time correspond to measurements or determinations of the actual position and are correspondingly typically afflicted with statistical errors. The first and the second point in time are thereby temporally differentiated from each other by a certain time duration, wherein the second point in time follows after the first point in time. In some embodiments, the second reference position at the second point in time can further be determined based on other data, for example through interpolation based on data at a third point in time, for example if there is no captured reference position available for a certain point in time. The capturing of the reference position and the determination of the calculated position can thus be synchronized.

In further embodiments, the movement data of the mobile unit comprises a velocity and/or directional information. A positioning can thereby be determined based on an assessment of the self-movement of the mobile unit.

The capturing of the movement data may take place in a generally known manner, wherein in particular data on the position as well as on the change in the position of the mobile unit depending on time may be captured. This can be for example the value of a velocity as well as a movement direction. In particular, the velocity can be represented as a vector, i.e., with a value and a direction. The vector may further be assigned to a position and/or temporal information, for example the velocity at a certain point in time and/or a certain position. The direction information may further comprise a change in the movement direction, for example in the case of acceleration, a steering procedure or other indicators for a direction change.

The movement data may be captured using sensors of any known type. The movement data may further comprise additional captured data, for example image data, data from lidar and radar sensors, information on a spatial alignment of the mobile unit and/or data from further apparatuses, in particular the mobile unit.

The determination of the calculated second position takes place based on the first captured reference position and the captured movement data. In doing so, dead reckoning can be performed for instance, wherein for example an actual position relative to a first position can be determined based on the self-movement of the mobile unit. In the case of the method, its actual position, in particular at the second point in time, can thus be determined starting from the first reference position based on the self-movement of the mobile unit. An EgoMotion process can thereby be used in particular. The calculated second position can further be determined based on additional data, for example based on information on the means through which the movement of the mobile unit is conveyed, for example via a vehicle and properties relevant for its forward motion such as wheel base, mass, chassis, etc.

Alternatively or additionally and in some embodiments, further sensor data can be used for incremental optical data, radar data or data captured in another manner, wherein relative positions in particular can be determined based on other sensor data.

The neural network may be used in a generally known manner to determine the calculated second position. In particular, a continuous comparison of the calculated second position with the captured second reference position may take place. The comparison may take place at fixed or variable temporal or spatial intervals. In the case of the comparison between the calculated second position and the second reference position at the second point in time, a quantitative measure may be determined for the difference between the two positions. In particular, the value and the direction of a deviation may be determined.

The neural network has at least one parameter, which can be adjusted based on the comparison. In particular, a learning process of the neural network may be performed, for example by means of a backpropagation algorithm. The learning process may thereby be continuously repeated so that a continuous learning of the neural network takes place during the operation of the positioning system according to the present aspect. In particular, a continuous improvement of the positioning may thereby be achieved by the neural network through the comparison between the second reference position and the calculated second position.

In some embodiments, it is provided that the parameter at the beginning of the current method is provided such that the determination of the calculated second position can already be performed at the beginning with a predetermined quality. The parameter can be predetermined for example such that the calculated second position at the beginning of the method can already be determined with such certainty that, for a predetermined short duration, a failure of the reference localization unit can be compensated for by means of the neural network. Furthermore, the parameter can be predetermined such that a positioning fulfills predetermined minimum conditions for the confidence of the determined position values.

In particular embodiments, a pretrained neural network is provided; this means that the parameter of the neural network has already been adjusted previously based on a learning process. This can take place for example such that the parameter for a pretrained neural network is determined and provided by the manufacturer of the mobile unit. Because of that, the discussed method may be used for positioning from the very beginning, wherein the method, however, simultaneously provides a further adjustment of the parameter so that the parameter can be further improved and/or adjusted for changed conditions.

In the positioning system according to present aspect, the determination of the calculated second position by the neural network can be improved continuously in that the results of the calculation are continuously compared with the captured reference positions. It may thus also be continuously taken into consideration if a gradual change in the circumstances of the movement takes place. For example, wear and tear or irregularities in the means for forward motion of the mobile unit can lead to the fact that the determination of the calculated second position cannot be performed permanently according to exactly the same model. Through the learning of the neural network, such changes be understood without having to provide a complex model for it.

In some embodiments, an operating status may be determined for the reference localization unit and either the second reference position or the calculated second position can be output depending on the operating status. Therefore, positions are available that are determined in different ways, wherein a value identified as being particularly reliable can be accessed in order to enable for example an improved redundancy of the positioning system.

The operating status may comprise for example information about whether the reference localization unit has a malfunction. In the case of such a malfunction, the second reference position cannot be determined or can only be determined imprecisely. The operating status can thus be captured in different generally known ways. For example, it can be captured whether the needed signals can be received in the case of a satellite-supported localization. Furthermore, a functionality of sensors can be monitored, through which data for localization can be captured, for example optical sensors, radar sensors or other sensors.

In particular, system-inherent complications during the localization may thereby be taken into consideration, for example if no satellite signals can be received in the case of a position in a tunnel. Furthermore, for example, components of the reference localization unit may be monitored, wherein for example an interruption or instability in the power supply to a component can be captured. In particular, the determined operating status may comprise information about whether a permanent or temporary malfunction is present.

Furthermore, an uncertainty for the captured second reference position may be output by the reference localization unit, for example a standard deviation or a confidence interval. The uncertainty can be assessed, wherein for example it can be determined based on a threshold value whether the second reference position was captured with sufficient certainty and/or accuracy.

Depending on the operating status it can be decided whether the second reference position or the calculated second position should be output. The output may, e.g., take place to a further apparatus, which can execute further functions based on the output position. For example, the output can take place to a navigation system and/or to a system for a partially or fully autonomous movement controller for the mobile unit. Furthermore, an output can be generated, which can be captured by a user, for example by means of a display.

It can thus, e.g., be ensured that, in the case of a malfunction of the reference localization unit, the second reference position possibly afflicted with a significant fault is not output, but rather the calculated second position in order to enable continued functionality in particular for other apparatuses. The calculated second position can thus be used as a redundant system; this means that a replacement for data from a partially or completely failed reference localization unit may be provided.

In further embodiments, the operating status can be determined based on a plausibility check for the second reference position. The operating status can thereby be made dependent on whether the results of the capturing of the second reference position are suitable for further processing. For example, it can thereby be captured whether a change in the position from the first to the second point in time appears plausible in light of the captured movement data or whether the data from the reference localization unit suggests an implausible, volatile change in the movement. In further exemplary embodiments, other methods can be used alternatively or additionally in order to determine the operating status and to capture in particular malfunctions in the reference localization unit.

In further embodiments, the positioning system further comprises an assessment unit, through which a quality signal for the calculated second position can further be determined based on a comparison of the second reference position with the calculated second position. The quality signal of the calculated second position may comprise in particular information on the certainty with which the calculated second position of the mobile unit can be determined, wherein the quality signal depends on a period of time between the first and the second point in time. Because of that, information may be provided on how reliably the calculated second position can be determined and for which temporal interval the calculated second position can be determined with which certainty.

Furthermore and in some embodiments, it can be determined for example based on the quality signal, for which apparatuses the calculated second position for the second point in time offers a sufficient certainty during the localization. In particular, a controlling of safety-relevant functions, for example an autonomous or partially autonomous movement control of the mobile unit, may be executed depending on the quality signal, wherein for example a threshold value may be determined, which if fallen short of by the quality signal causes the safety-relevant function to no longer be executed.

Moreover, information may, e.g., be provided about the certainty with which the calculated second position can be determined in a certain temporal and/or spatial interval with respect to the first reference position. The certainty of the determination of the calculated second position depends in particular on the amount of time between the first and the second point in time. Typically, the calculated second position may be determined with less certainty the further away the second point in time, at which the mobile unit is located at the second position, is from the first point in time of the capturing of the first reference position starting from which the determination of the calculated second position is performed. For example, phenomena during the capturing of the movement data such as drift and technically caused uncertainties of the capturing unit can be responsible for this. It can thus be determined for example how long after the occurrence of a malfunction or a failure of the reference localization unit a reliable determination of the calculated second position based on the neural network can take place.

In some embodiments, either the second reference position or the calculated second position may be output depending on the quality signal. The calculated second position can thereby be accessed for example in the event of a malfunction of the reference localization unit. This enables a redundant design of the positioning system so that the functionality in particular of additional apparatuses can be ensured even in the event of a failure of a component.

In some embodiments, a trajectory of the mobile unit may be determined by a trajectory planning unit based on the calculated second position. In particular, an at least partially autonomous control of the movement of the mobile unit may be performed based on the determined trajectory. The output of the calculated second position may thereby be used in order to execute additional functions besides determining the position. In particular, a correction in the movement of the mobile unit may take place starting from the current position to a desired position.

In a second aspect, a vehicle has a positioning system as described above. The movement data of the vehicle may comprise in particular a velocity and/or a steering angle. The movement data may further comprise data on the operation of the vehicle.

In some embodiments of the vehicle according to the present aspect, the vehicle is at least partially automatically controllable. A safe driving mode of the vehicle can thereby be activated depending on the operating status of the reference localization unit, wherein the vehicle can be controlled based on the calculated second position in case the secure driving mode is activated. Thereby, a secure driving mode may be activated depending on the operation of the reference localization unit, for example depending on its functionality.

In particular, the secure driving mode may be activated if a safety-relevant system can no longer be operated with the required redundancy. In the case of the secure driving mode, in particular the movement of the vehicle is controlled such that collisions with objects, for example other traffic participants, are reliably avoided, wherein the manner of driving is performed particularly carefully in order for example to compensate for a failure or a malfunction of a unit for the positioning. For example, it can be ensured in the case of the failure of the reference localization unit that the vehicle is decelerated, brought to a stop in a safe manner or brought to another safe state, wherein the calculated second position can be accessed alternatively for the control. A manual control can be activated alternatively or additionally.

In some embodiments, the calculated second position can be furthermore determined based on operating data from the vehicle. A more exact positioning may be achieved.

The operating data from the vehicle may comprise for example an actuation of the pedals, in particular the brake or gas pedal, settings on the chassis of the vehicle, a tire pressure, a measure for a friction of a mechanical component of the vehicle, a wheelbase and/or the mass of the vehicle. It can thereby be ensured by the positioning system that a continuous adjustment to parameters relevant for the positioning can take place through the comparison of the second reference position with the calculated second position, in particular by the continuous performance of this comparison. For example, the tire pressure for different tires can change with time, which cannot be taken into consideration in conventional models for positioning, for example in typical EgoMotion processes, since this would require an excessively complex modeling. Through the neural network, such changes can also be taken into consideration without explicit knowledge about them, since here the determination of the calculated second position is gradually adjusted based on the adjusted parameter even without needing to determine the exact cause of change based on measurements.

In another aspect of a method for operating a positioning system for a mobile unit, a first reference position of the mobile unit is captured at a first point in time. Movement data from the mobile unit is captured, and a calculated second position of the mobile unit is determined at a second point in time by means of a neural network based on the first reference position and the captured movement data. A second reference position of the mobile unit is captured at the second point in time, wherein a parameter of the neural network is adjusted based on a comparison of the second reference position with the calculated second position.

The method according to the present aspect is designed in particular for operating a positioning system as described above. The method shows the same benefits as the positioning system according to the preceding aspect.

In some embodiments of the method according to the present aspect, the parameter is adjusted based on a learning process of the neural network. An improvement of the calculation of the calculated second position can thereby take place, in particular for future calculations. Generally known learning methods for neural networks may be used, for example a backpropagation algorithm.

In some embodiments, an operating status is determined for a reference localization unit, through which the reference positions can be captured, wherein either the second reference position or the calculated second position can be output depending on the operating status. Thus the calculated second position may beneficially be used if the capturing of the second reference position by the reference localization unit is for example uncertain, faulty or impossible.

In particular, the operating status comprises information on the quality with which data can be captured by the reference localization unit or respectively with which certainty the localization of the mobile unit can take place based on this data. It may thereby be ensured for example for safety-relevant driving functions that the localization can be provided with sufficiently high accuracy and/or certainty.

In some embodiments, an autonomous control of the movement of the mobile unit is performed based on the output position. A partially or completely automatic control of a vehicle can thereby take place, wherein the second reference position and/or the calculated second position can be used. It can thereby be decided for example based on the operating mode of the reference localization unit, which position is used with priority.

In particular, the autonomous control comprises a comparison of an actual position of the mobile unit at a point in time with a desired position along a trajectory, wherein the mobile unit is supposed to be controlled along the trajectory. If the actual position and the desired position differ from each other, then a correction can take place through the autonomous control, wherein in particular means for the movement of the mobile unit are used. The actual position at the second point in time can thereby be determined based on the second reference position and/or the calculated second position. In particular, the second reference position or the calculated second position is used as the actual position depending on the operating status of the reference localization unit, wherein the calculated second position is used in particular when the operating status indicates a reduced quality of the capturing of the second reference position.

The invention is now explained based on further exemplary embodiments with reference to the drawings.

An exemplary embodiment of the vehicle according to the invention is explained with reference to FIG. 1.

A vehicle 1 comprises a control unit 5, with which a reference localization unit 2, a capturing unit 3, a computing unit 4 as well as a trajectory planning unit 7 are coupled. The control unit 5 further comprises an assessment unit 6.

Through the reference localization unit 2, a separable data-technical connection to a navigation satellite system 10 can be produced, wherein in particular signals from the navigation satellite system 10 can be received. Based on the received signals, a position of the vehicle 1 can be determined by the reference localization unit 2. A GPS system is used in the exemplary embodiment. In further exemplary embodiments, other systems can be provided alternatively or additionally, wherein for example the position in a global coordinate system or in a relative coordinate system can be captured. Systems that improve the positioning through additional measures can thereby also be used.

The reference localization unit 2 further determines an operating status, which comprises information about whether the reference localization unit 2 is functioning optimally and, in particular, it is thereby taken into consideration whether and with which quality satellite signals of the satellite navigation system 10 are received. In a further exemplary embodiment, it can be provided that the operating status is determined alternatively or additionally by the unit 5, wherein for example a plausibility check can be performed for the data output by the reference localization unit 2.

Figure 2:
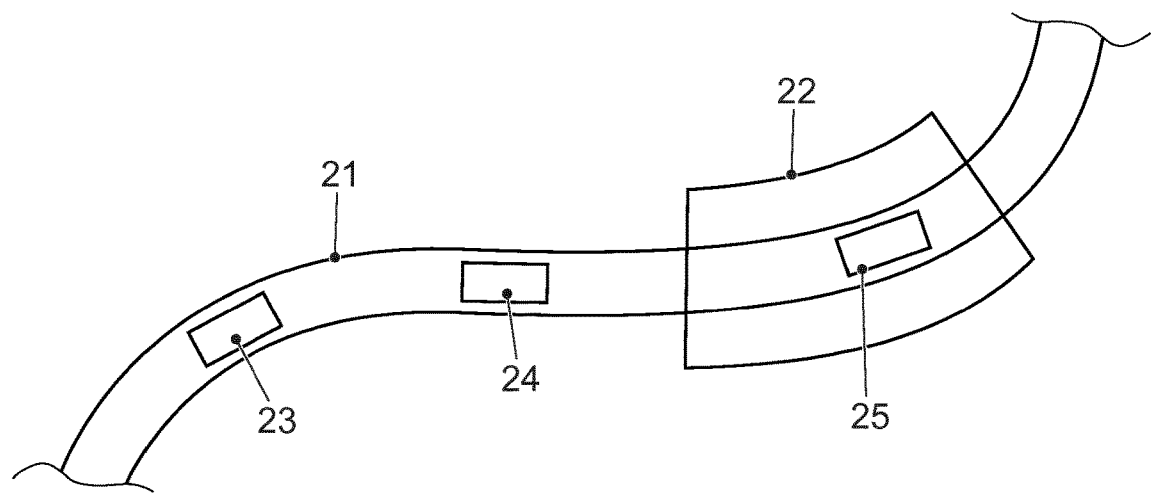
FIG. 2 shows an exemplary embodiment of the method according to the invention.

An exemplary embodiment of the method according to the invention is explained with reference to FIG. 2. The exemplary embodiment of the vehicle 1 according to the invention explained above with reference to FIG. 1 is thereby assumed.

The vehicle 1 moves along a street 21, which progresses through a tunnel 22. A first actual vehicle position 23 at a first point in time T1 is thereby shown in FIG. 2 as well as a second actual vehicle position 24 at a later second point in time T2 and a third actual vehicle position 25 at an even later third point in time T3. The vehicle 1 is thereby located in the tunnel 22 at the third point in time T3.

In the case of the method, the position of the vehicle 1 at the points in time T1, T2, T3 is determined in different manners. At the first point in time T1, a first reference position is determined by the reference localization unit 2, wherein the navigation satellite system 10 is used. The reference localization unit 2 thereby receives signals from navigation satellites and determines a first reference position based on the signals. It is assumed in the exemplary embodiment that the first reference position corresponds well to the first actual vehicle position 23 at the first point in time T1. In particular, the accuracy, for example a standard deviation or a confidence value, is determined and output together with the first reference position.

In the exemplary embodiment, the determined position of the vehicle 1, in this case the first reference position, is output to the trajectory planning unit 7. It determines a planned trajectory of the vehicle 1, in the present case along the street 21, and the control unit 5 controls control means of the vehicle 1 such that a partially or completely autonomous movement of the vehicle 1 takes place along the planned trajectory. If a certain position of the vehicle 1 deviates from the planned trajectory, then for example interventions take place into the movement of the vehicle 1, through which the planned trajectory is again achieved.

In the time interval between the first point in time T1 and the second point in time T2, the vehicle 1 moves from the first actual vehicle position 23 to the second actual vehicle position 24. During this movement, movement data of vehicle 1 is captured by the capturing unit 3. This movement data comprises in particular the velocity of the vehicle 1 as well as the yaw rate and/or the steering angle. It can be provided in further exemplary embodiments that additional data can be captured, for example on a tilt, the mass, the wheelbase and/or additional data from vehicle 1.

The position of the vehicle at another point in time, in particular at the second point in time T2, can now be calculated by the computing unit 4 by means of a neural network based on the first reference position at first point in time T1 and the captured movement data. In particular, the calculation takes place according to an EgoMotion localization and/or dead reckoning. In further exemplary embodiments, other methods can be used alternatively or additionally, wherein a neural network is however always used for the calculation.

The neural network thereby has at least one parameter, wherein the accuracy and certainty of the calculation can be improved by optimizing the parameter. The optimizing of the parameter thereby takes place based on a backpropagation algorithm for learning in the neural network, wherein the calculated position for a point in time is compared with a captured reference position for the same point in time. An adjustment of the parameter is performed based on the comparison. Other methods for learning of the neural network can be used alternatively or additionally.

In the exemplary embodiment, a second reference position is captured by the reference localization unit 2 at the second point in time T2 at which the vehicle 1 is located at the second actual vehicle position 24. Furthermore, a calculated second position for the point in time T2 is determined by the computing unit 4 by means of the neural network. The second reference position and the calculated second position are compared with each other and an adjustment of the parameter of the neural network is performed if there are any deviations.

A quality signal is further determined by the assessment unit 6 based on the comparison. The quality signal comprises information on the certainty with which the position of the vehicle 1 can be calculated by the neural network, wherein a reference position at a certain point in time is assumed and the calculated position is calculated at a later point in time based on the movement data. It is thereby taken into consideration in particular with which certainty the calculated position for later points in time can be securely determined at a certain temporal interval from the point in time of the reference position. The calculated position can thereby typically be determined with more certainty, the shorter the time interval between the point in time of the reference position and the point in time of the calculated position is. In particular, the quality signal in the exemplary embodiment specifies at what temporal interval from the capturing of a reference position the position of the vehicle 1 can be determined by the neural network with which certainty.

For the reference localization unit 2, as described above, an operating status is captured, which comprises in particular information on the certainty with which the reference position can be determined. The exemplary embodiment provides that depending on the operating status either the reference position captured by the reference localization unit 2 or the calculated position determined by the neural network is output to the trajectory planning unit 7. The output of the calculated position thereby takes place if the capturing of the reference position cannot take place with sufficient certainty. For this, for example a comparison of the operating status with a threshold value can be performed, wherein depending on the threshold value higher or lower demands can be established for the safe function of the reference localization unit 2. It is assumed here that at the second point in time T2 the reference localization unit 2 functions without problems and the thereby determined second reference position is output to the trajectory planning unit 7.

In the exemplary embodiment, the vehicle 1 moves to the third actual vehicle position 25 in the tunnel 22 between the second point in time T2 and the third point in time T3. The connection between the reference localization unit 2 and the navigation satellite system 10 is thereby interrupted and satellite signals can no longer be received. As a result, a reliable capturing of the reference position of the vehicle 1 is not possible at the third point in time T3. The operating status of the reference localization unit 2 is formed such that it comprises information on the receiving problems or respectively the unreliable function of the reference localization unit 2.

For the third point in time T3, a calculated position of the vehicle 1 is determined by the computing unit 4 based on the neural network, wherein in particular the second reference position captured for the second point in time T2 as well as movement data of vehicle 1 on the movement between the second point in time T2 and the third point in time T3 are assumed. The determination further takes place based on the adjusted parameter of the neural network.

Following an assessment of the operating status of the reference localization unit 2 it is decided to output the calculated position determined by the computing unit 4 to the trajectory planning unit instead of a reference position captured by the reference localization unit 2. A further control of the vehicle 1 takes place based on the calculated position determined by the computing unit 4.

A safe driving mode of the vehicle 1 is thereby activated in the exemplary embodiment. In the case of a completely autonomous ride, the vehicle 1 is controlled in the safe driving mode by the trajectory planning unit 7 and the control unit 5 such that it is safely brought to a stop if manual control takeover by a driver does not take place. The failure of the reference localization unit is thereby reacted to. Alternatively or additionally, a warning can be output to a driver or another user. If the safe driving mode is activated, for example the velocity of the vehicle 1 can be reduced, overtaking maneuvers can be avoided, the vehicle 1 can be controlled to a stopped position and/or a warning light can be activated.

In particular the quality signal generated by the assessment unit 6 is thereby used to determine how long a determination of the calculated position by the computing unit 4 is possible with sufficient accuracy and certainty for an automatic control of the vehicle 1. In the safe driving mode, the control can take place in particular in that the vehicle 1 is brought into a safe state, for example a stop or under the complete manual control of a driver until the point in time when the calculated position can be determined with sufficient certainty.

It can thereby be further taken into consideration whether the operating status of the reference localization unit 2 improves again before this point in time is reached, for example because the vehicle 1 has already left the tunnel 22 again up to this point in time and the receipt of satellite signals is possible again. This can be determined and taken into consideration for example through data from a navigation system on the traveled street 21 and the position of the tunnel 22.

It can be provided in particular that the operating status is determined such that a malfunction of the reference localization unit 2 is differentiated from a system-determined change in the quality of the determined position. It can thereby be taken into consideration for example that no signals can be received from a navigation satellite system when entering the tunnel 22, wherein however upon exiting the tunnel 22 it should be expected within a certain time that the signals can be received again reliably. In such a case, the activation of the safe driving mode can be suppressed so that passage through the tunnel 22 is enabled. In particular, this can take place depending on the quality signal, wherein it is determined whether the positioning is ensured with sufficient certainty based on the neural network. It can be ensured in this manner that it is also possible to continue the ride in the event of the temporarily limited functionality of the reference localization unit 2, wherein the neural network is alternatively used for positioning.

It can be provided in further exemplary embodiments that the vehicle 1 does not transition to a safe driving mode or that another driving mode is activated, for example with otherwise changed control properties, for example a particularly defensive manner of driving and/or an avoidance of certain driving maneuvers.

In further exemplary embodiments, the determination of the position takes place through the reference localization unit 2 alternatively or additionally based on further sensors, for example based on a laser scanner, a radar sensor, an ultrasound sensor and/or a camera. In particular, the position relative to landmarks in a vicinity of the vehicle 1 is thereby determined, for example a lateral position relative to the edges and/or roadway markings of the street 21. Analogously to the exemplary embodiments described above, the operating status can thereby comprise information on whether the sensors are completely functional and whether the determination of the position of the vehicle 1 is possible with sufficient accuracy based on the sensor data. Furthermore, the movement data can also comprise data from these sensors and can be used to determine the calculated second position. For example, the other sensor data can be accessed by the neural network in the event of a failure of a satellite-supported localization. Furthermore, a failure of one or more sensors or sensor systems can be compensated for by reaccessing a position calculated by the neural network.

REFERENCE LIST

1 Mobile unit; vehicle
2 Reference localization unit
3 Capturing unit
4 Computing unit
5 Control unit
6 Assessment unit
7 Trajectory planning unit
10 Navigation satellite system (GPS)
21 Street
22 Tunnel
23 First actual vehicle position (at the first point in time)
24 Second actual vehicle position (at the second point in time)
25 Third actual vehicle position (at the third point in time)
T1 First point in time
T2 Second point in time
T3 Third point in time The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:
1. A positioning system for a mobile unit, the system comprising:

a reference localization unit capturing a first reference position at a first point in time and a second reference position at a second point in time;

a capturing unit sensing movement data of the mobile unit at the first reference position, the movement data including an instantaneous velocity;

a computing unit programmed to calculate a predicted second position of the mobile unit at the second point in time using a neural network based on the first reference position and the captured movement data;

wherein the computing unit compares the second reference position with the calculated predicted second position and uses a result of the comparison to adjust at least one parameter of the neural network; and a valuation unit determines a quality value for the calculated predicted second position based on the comparison between the second reference position and the calculated predicted second position; and wherein the positioning system uses the quality value to determine how long a calculated predicted second position may be used for automatic control of the mobile unit.

2. The positioning system according to claim 1, wherein the reference localization unit captures the first reference position and the second reference position using a navigation satellite system.

3. The positioning system according to claim 1, wherein an operating status can be determined for the reference localization unit and
either the second reference position or the predicted second position can be output depending on the operating status.

4. The positioning system according to claim 3, wherein the operating status can be determined based on a plausibility check for the second reference position.

5. The positioning system according to claim 1, wherein a trajectory of the mobile unit can be determined by a trajectory planning unit based on the predicted second position.

6. A vehicle comprising:
a chassis;
a drive propelling the vehicle along a movement path;
a reference localization unit capturing a first reference position on the movement path at a first point in time and a second reference position on the movement path at a second point in time;
a capturing unit sensing movement data of the mobile unit at the first reference position, the movement data including an instantaneous velocity; and
a computing unit programmed to calculate a predicted second position of the mobile unit at the second point in time using a neural network based on the first reference position and the captured movement data; wherein
the computing unit compares the second reference position with the calculated predicted second position to determine a quality value; and
the computing unit uses the quality value to determine how long a calculated predicted second position may be used for automatic control of the mobile unit and to adjust at least one parameter of the neural network.

7. The vehicle according to claim 6, wherein the vehicle can be controlled at least partially automatically, wherein
a safe driving mode of the vehicle can be activated depending on an operating status of the reference localization unit, wherein
the vehicle can be controlled during the activated safe driving mode based on the predicted second position.

8. The vehicle according to claim 7, wherein the predicted second position can be further determined based on operating data from the vehicle.

9. The vehicle according to claim 6, wherein the predicted second position can be further determined based on operating data from the vehicle.

10. A method for training a positioning system for a mobile unit, the method comprising:
capturing a first reference position of the mobile unit at a first point in time;
capturing movement data from the mobile unit, the movement data including an instantaneous velocity;
calculating a predicted second position of the mobile unit at a second point in time using a neural network based on the first reference position and the captured movement data; and
capturing a second reference position of the mobile unit at the second point in time;
comparing the predicted second position to the captured second reference position; and
adjusting a parameter of the neural network based on a comparison of the second reference position with the calculated predicted second position;
determining a quality value for the calculated predicted second position based on the comparison between the second reference position and the calculated predicted second position; and
using the quality value to determine how long a calculated predicted second position may be used for automatic control of the mobile unit.

11. The method according to claim 10, wherein the parameter is adjusted based on a learning process of the neural network.

12. The method according to claim 11, further comprising determining an operating status for a reference localization unit, through which the reference positions can be captured, and
transmitting out either the second reference position or the predicted second position can be output depending on the operating status.

13. The method according to claim 10, further comprising determining an operating status for a reference localization unit, through which the reference positions can be captured, and
transmitting out either the second reference position or the predicted second position depending on the operating status.

14. The method according to claim 10, further comprising performing an autonomous control of the movement of the mobile unit based on either the second reference position or the predicted second position.

* * * * *